Patented Jan. 12, 1932

1,840,760

UNITED STATES PATENT OFFICE

WILLIAM H. WILLIAMS, OF MIDLAND, MICHIGAN, ASSIGNOR TO THE DOW CHEMICAL COMPANY, OF MIDLAND, MICHIGAN, A CORPORATION OF MICHIGAN

PROCESS OF MAKING AROMATIC AMINO COMPOUNDS

No Drawing. Application filed August 26, 1926. Serial No. 131,810.

This improvement relates more particularly to the preparation of aromatic amino compounds, such as aniline and the like, from halogenated aromatic hydrocarbons. It has been proposed (German Patent 204,951) to make aniline by heating 1 mol. of chlorobenzene with 5 mols. of ammonia. This procedure however is objectionable in the use of such a large excess of ammonia, and in order to be workable, it requires an extensive ammonia recovery system. If the excess of ammonia be cut down, the yield of aniline falls, and such products as phenol, diphenyloxide, etc., result correspondingly. A process not calling for an excess of ammonia, with its operating difficulties and expense, is accordingly highly desirable.

To the accomplishment of the foregoing and related ends, the invention, then, consists in the features hereinafter fully described, and particularly pointed out in the claims, the following description setting forth but a few of various ways in which the principle of the invention may be used.

In accordance with the invention, a halogen derivative of benzene or its homologues and ammonia or a salt of ammonia from which ammonia can be set free, in a suitable solvent, for instance water or alcohol, are heated under pressure, and preferably in the presence of a compound acting to make ammonia more available. This may be a compound such as is capable of displacing ammonia from its salts, or an ammonia carrier, or both may be used. Instances of the former are alkaline hydroxides, i. e., the alkali or the alkaline-earth hydroxides. As carriers are understood compounds having the property of holding ammonia in solution by forming therewith a double compound or complex, examples of which are metallic chlorides such as chloride of calcium or other alkaline-earth metals or of zinc or of silver.

As an example illustrating the invention, the following may be mentioned: 160 parts (by weight) of bromobenzene, 25 parts of ammonia, 30 parts of lime, 100 parts of water, and 4 parts of cuprous oxide are heated for about thirty-six hours at 175° C. under a pressure of about 200 lbs. per square inch. The ammonia may be charged in at the start, or it may be fed in during the run in gaseous, liquid or solution form. At the end of the reaction, the products are cooled down to about 125° C. and steam is blown through to steam out the aniline.

As another illustration: 2 mols. of chlorobenzene, 2 mols. of ammonia, 1 mol. of calcium hydroxide, 1 mol. of calcium chloride, and 1/20 mol. of copper sulphate, are heated similarly as in the above.

The copper salts may be omitted, but these act catalytically and are advantageous. Other copper compounds for instance cuprous oxide may be used. Metallic copper also acts similarly.

The amine may be purified by acidification of the reaction-product mixture, and steam distillation, which removes the unreacted halogen derivative as well as the byproducts formed. The acid solution after steaming out may then be neutralized to free the base, or may be evaporated to crystallization and the amine recovered as an acid salt, or by any other procedure desired.

Other modes of applying the principle of the invention may be employed, change being made as regards the features here disclosed, provided the steps stated by any of the following claims, or the equivalent of such stated steps be employed.

I therefore particularly point out and distinctly claim as my invention:—

1. A process of making aniline, which includes heating under pressure chlorobenzene with ammonia, calcium hydroxide and calcium chloride, in the presence of a copper-containing catalyst.

2. A process of making aniline, which includes heating under pressure chlorobenzene, ammonia, calcium hydroxide, and calcium chloride, in the proportions of about two molecules each of the chlorobenzene and the ammonia, and one molecule of the calcium hydroxide and calcium chloride, in the presence of a copper-containing catalyst.

3. A process of making aniline which includes heating under pressure chlorobenzene with ammonia and calcium hydroxide, in the presence of a copper-containing catalyst.

4. A process of making an arylamine of the benzene series, which comprises heating under pressure a halogenated benzene hydrocarbon with ammonia and an alkaline earth metal hydroxide in the presence of a copper-containing catalyst.

5. A process of making an arylamine of the benzene series, which comprises heating under pressure a halogenated benzene hydrocarbon with ammonia and calcium hydroxide in the presence of a copper-containing catalyst.

6. A process of making an arylamine of the benzene series, which comprises heating under pressure a halogenated benzene hydrocarbon with ammonia and calcium hydroxide in the presence of calcium chloride and a copper containing catalyst.

Signed by me this 20th day of August, 1926.

WILLIAM H. WILLIAMS.